E. H. LUNKEN.
COMBINED THROTTLE VALVE AND LUBRICATOR.
APPLICATION FILED OCT. 5, 1908.

910,401.

Patented Jan. 19, 1909.

Witnesses.
Homer Bradford.
Charles W. Hoffman

Inventor:
Edmund H. Lunken
by Alfred M. Allen
Attorney

UNITED STATES PATENT OFFICE.

EDMUND H. LUNKEN, OF DENVER, COLORADO, ASSIGNOR TO THE LUNKENHEIMER COMPANY, OF CINCINNATI, OHIO, A CORPORATION OF OHIO.

COMBINED THROTTLE-VALVE AND LUBRICATOR.

No. 910,401.

Specification of Letters Patent.

Patented Jan. 19, 1909.

Application filed October 5, 1908. Serial No. 456,328.

*To all whom it may concern:*

Be it known that I, EDMUND H. LUNKEN, a citizen of the United States, residing in Denver, in the county of Arapahoe and State of Colorado, have invented certain new and useful Improvements in a Combined Throttle-Valve and Lubricator, of which the following is a full, clear, and exact description, reference being had to the accompanying drawings, forming part of this specification.

My invention relates to throttle valves such as are used on pipe lines for compressed air, to control the supply of air in the operation of pneumatic drills and the like, and the object of the invention is to combine with the throttle valve construction a simple, cheap and effective method of supplying and automatically feeding lubricating oil to the drill or other tool, in proper regulated quantities with each operation of the throttle.

The invention consists of that certain novel construction of parts, to be hereinafter particularly pointed out and claimed, whereby the plug and handle of the valve are constructed to serve as a receptacle for the oil, and in which with each operation of the valve a small quantity of oil is fed and sprayed into the cylinder by the air pressure.

Figure 2:
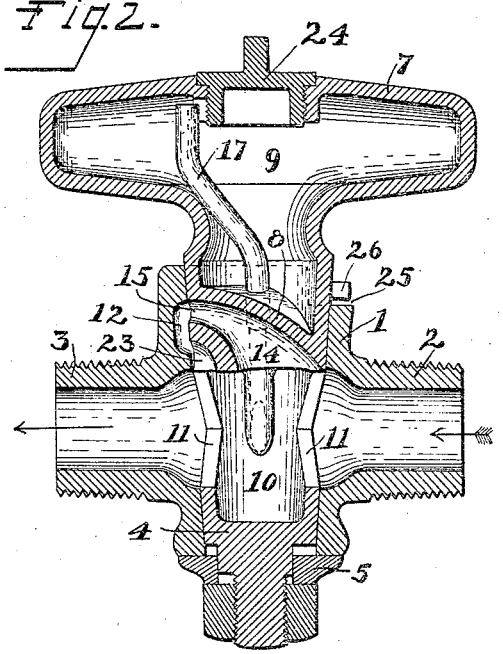
Figure 1:
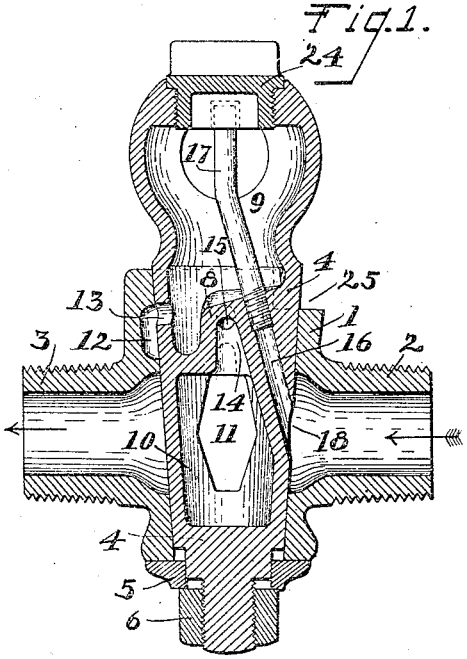
Figure 4:
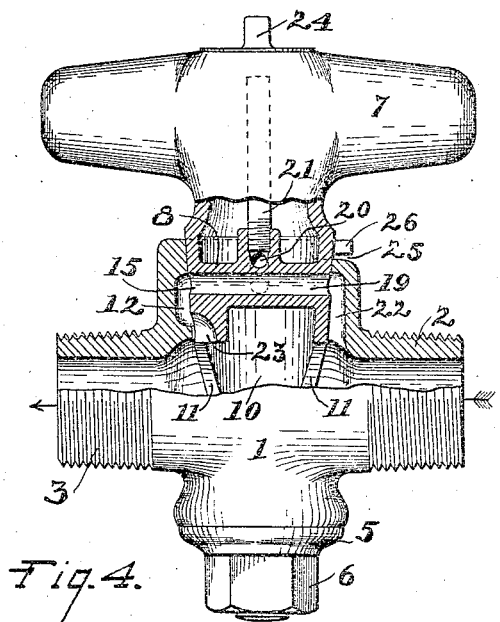
Figure 3:
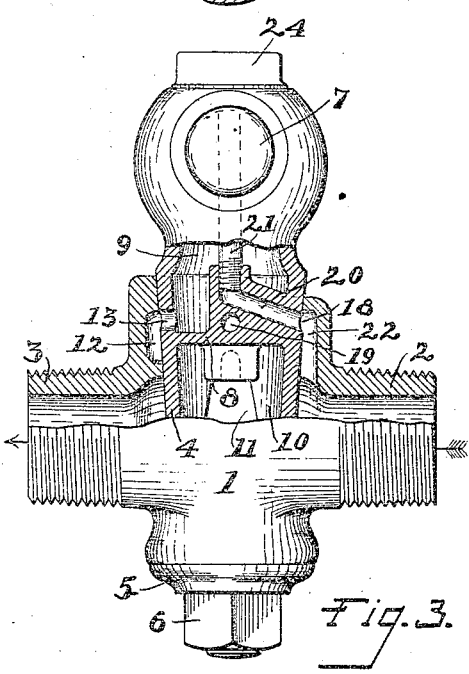

In the drawings, Figure 1 is a central vertical section of the device with the valve closed. Fig. 2 is a similar section with the valve open. Fig. 3 is a side elevation partly in vertical section, of a slightly modified construction with the valve closed. Fig. 4 is a similar view with the valve open.

1 is the valve casing, provided with a screw threaded inlet 2, and a screw threaded discharge 3, for connection with the pipe line, and this casing is provided with the usual slightly conical bore for the reception of the tapered plug 4, held in place by the usual washer 5, and nut 6.

7 is the handle for turning the cock preferably made in one piece with the plug, and the handle and plug are both hollow, the hollow space being divided by the partition wall 8, leaving a chamber 9, in the upper portion of the plug and handle, and a lower chamber 10, through which lower chamber are the lateral hexagonal openings 11, 11, through which openings the main body of the gas passes when the valve is opened.

12 is a small recess formed in the valve casing on the delivery side, and 13 is an opening through the wall of the plug into the reservoir or chamber 9.

14 is a passageway from the upper portion of the plug chamber 10, which opens out through the wall of the plug at 15, at a point ninety degrees from the opening 13, and 16 is a passageway drilled upward through the division wall of the plug, and continued by the pipe 17, opening into the upper part of the reservoir 9, very close to the top. This passageway 16 at its lower end 18, opens into the inlet passageway of the valve at a point opposite the opening 13.

Instead of forming a curved passageway 14, a straight passageway 19 can be drilled directly through the plug in the division wall, and instead of drilling a passageway 16 almost vertically upward a corresponding passageway 20, can be drilled to the center of the plug and thence extending upward to open into the top of the reservoir through the central vertical pipe 21, as shown in the modified construction illustrated in Figs. 3 and 4. In this event in order that the passageways 19 and 20 may open into the inlet side of the valve, the casing is bored out at 22. In other respects the two constructions are similar and the identical parts are indicated by like reference numerals.

23 is a passageway through the wall of the plug, directly underneath the opening 15, registering with recess 12 and opening into the chamber 10, on the discharge side of the valve immediately above the main plug opening 11.

24 is a screw cap for closing the reservoir 9, and through which the lubricating oil is filled into the reservoir.

When the valve is in use and the reservoir has been filled with oil and closed by the cap 24, when the valve is shut as shown in Fig. 1, the opening 13 near the base of the reservoir will be in line with the recess 12, in the valve casing, and the oil will fill this recess by gravity or under the pressure of the compressed air which enters on top of the oil in the reservoir, through the passageway 16, and the pipe 17. It will be understood that this passageway 16, and pipe 17, is for the purpose of applying pressure on the oil to insure its feeding into the recess 12. It will frequently happen, however, that gravity alone will be sufficient to insure the proper feed, and in that event this passageway and pipe may be omitted, and the oil allowed to feed through the opening 13 by gravity. Now when the handle is turned to open the valve into the position shown in Fig. 2, the feed opening 13 and the passageway 16, will be closed, and the openings 15 and 23 brought into register with the recess 12, and the compressed air passing through the valve will also pass around through the passageways 14 and 23, and carry the oil which has been deposited in the recess 12 into the cylinder.

In order to limit the movement of the plug in either direction, the upper edge of the casing is cut away on one side 25, and a stop pin 26, rides in this cut out portion.

Having thus described my invention what I claim as new and desire to secure by Letters Patent, is:

1. In a device of the character specified, the combination with the valve casing, of a plug provided with an oil reservoir, a valve port through the plug registering with ports in the casing to form a passageway through the valve, and means to feed a measured charge of oil from the reservoir to the passageway each time the valve is closed and opened.

2. In a device of the character specified, the combination with the valve casing, of a plug having a handle, hollowed out to form an oil reservoir, a valve port through the plug registering with ports in the casing to form a passageway through the valve, and means to feed a measured charge of oil from the reservoir to the passageway each time the valve is closed and opened.

3. In a device of the character specified, the combination with the valve casing, of a plug having a handle, hollowed out to form an oil reservoir, a valve port through the plug registering with ports in the casing to form a passageway through the valve, a recess in the casing with feed opening from the reservoir registering with said recess when the valve is closed, and means for delivering the charge of oil from the recess to the valve passageway when the valve is open.

4. In a device of the character specified, the combination with the valve casing, of a plug having a handle, hollowed out to form an oil reservoir, a valve port through the plug registering with ports in the casing to form a passageway through the valve, a recess in the casing with feed opening from the reservoir registering with said recess when the valve is closed, and passageways from the valve port through the plug registering with said casing recess when the valve is open.

5. In a device of the character specified, the combination with the valve casing, of a plug having a handle, hollowed out to form an oil reservoir, a valve port through the plug registering with ports in the casing to form a passageway through the valve, a recess in the casing with feed opening from the reservoir registering with said recess when the valve is closed, a port hole in the plug with a tubular extension thereof to the upper portion of the oil reservoir, said port registering with the valve inlet port when the valve is closed, and passageways from the valve port through the plug registering with said casing recess when the valve is open.

EDMUND H. LUNKEN.

Witnesses:
JEROME J. AULL,
CHAS. C. WURSTER.